United States Patent [19]
Gaillard

[11] 3,800,801
[45] Apr. 2, 1974

[54] HEART STIMULATION APPARATUS AND METHOD OF TESTING ITS INSTALLATION

[75] Inventor: Robert Maurice Georges Gaillard, Paris, France

[73] Assignee: L'Electronique Medicale S.E.R.D.A.L. S.A., Paris, France

[22] Filed: Dec. 27, 1972

[21] Appl. No.: 318,938

[30] Foreign Application Priority Data
Dec. 28, 1971 France .............................. 71.47064

[52] U.S. Cl.............................. 128/419 P, 128/421
[51] Int. Cl........................................... A61n 01/36
[58] Field of Search .......................... 128/419 P, 421

[56] References Cited
UNITED STATES PATENTS

| | | | |
|---|---|---|---|
| 3,638,656 | 2/1972 | Grandjean et al................ | 128/419 P |
| 3,693,627 | 9/1972 | Berkovits........................ | 128/419 P |
| 3,517,663 | 6/1970 | Bowers et al.................... | 128/419 P |

Primary Examiner—Kyle L. Howell
Attorney, Agent, or Firm—Cushman, Darby & Cushman

[57] ABSTRACT

Heart stimulation apparatus, which is constructed as an implantable unit including a heart stimulator, terminal electrodes of the heart stimulator connectable to a patient's heart and a number of different shunts connected in parallel across the terminal electrodes each shunt having a separate remotely operable isolating switch, operable magnetically and a Zener diode, the known trigger voltage of each Zener diode being different. In use the shunts are remotely switched magnetically from the exterior of the patient, starting from the shunt of highest trigger voltage, until an electrocardiograph connected to the patient indicates a change in the voltage reading corresponding to the one of the known trigger voltages. It is thus possible to determine the value of the pulse potential of the heart stimulator. By switching in, for a short time, a shunt having relatively low trigger voltage, the stimulation threshold of the patient's heart can be determined.

10 Claims, 4 Drawing Figures

3,800,801

HEART STIMULATION APPARATUS AND METHOD OF TESTING ITS INSTALLATION

The present life relates to a heart stimulation apparatus and to a method of testing the installation thereof, in order to detect the lowering and the inadequacy of the voltage supplied to the heart electrodes, which could place the lift of the patient in grave danger.

A check on the functioning of conventional implanted heart-stimulators is usually carried out by examining electro-cardiograms obtained from voltages picked up at many points on the surface of the patient's body. It is thus proposed not only to check that the heart is being stimulated satisfactorily at a given instant, but also to analyse the stimulating pulse collected in the electro-cardiographic shunt, this analysis being used to detect possible defects such as a drop in the voltage of the batteries which supply the stimulators or a malfunctioning of the stimulator itself. However, this method only makes it possible to know, very roughly, the voltage actually applied to the electrodes implanted in the heart. In effect, the voltage picked up in the electro-cardiographic pick-up shunt corresponding to the stimulating pulse depends on a large number of factors, especially the distance between the stimulating electrodes and especially the orientation of the electrical axis of these two electrodes relative to the pick-up shunt of the electro-cardiograph.

According to one aspect of the invention there is provided a method of testing the installation of a heart stimulator within the body of a patient, such method comprising providing a plurality of voltage triggered conducting shunts, each having a separate remotely operable isolating switch, and connected in parallel across the terminal electrodes of the heart stimulator, the known trigger voltage of each shunt being different, connecting an electro-cardiograph to the heart of the patient, remotely switching said shunt in turn from the exterior of the patient, starting with a shunt of the highest trigger voltage until the electro-cardiograph indicates a change in the voltage reading corresponding to one of the known trigger voltages, and thus determining the value of the pulse potential of the heart stimulator.

With this method it is possible firstly to measure the amplitude of the pulse of the stimulator, in other words to know its actual value at the level of the stimulation, and secondly, to make it possible to assess the margin of stimulation between the physiological requirement and the operational condition of the apparatus placed in the human body.

Thus by applying a known low voltage to the heart electrodes by means of an external signal of short duration, a proportionality can be established between the corresponding voltage set up in the electro-cardiogram and the initial voltage set up, which corresponds to an unknown value, which varies with time, of the voltage produced by the heart-stimulator.

The method also consists of switching in for a short time a shunt having a sufficiently low level, for to stop the stimulation in such a way as to test the stimulation threshold of the heart.

The invention also provides heart stimulation apparatus comprising, as an implantable unit, a heart stimulator having terminal electrodes connectable to a patient's heart, a plurality of shunts connected in parallel across said terminal electrodes, each shunt including a separate remotely operable isolating switch and triggerable conducting means, the known voltage to trigger each shunt being different.

To form the switch, tube relays with low inertia contacts, controlled by a magnetic field, may be used, these contacts being connected electrically in parallel and switching in one of a number of shunts, provided with a triggerable conductor, e.g., a diode of the Zener type, the various shunts having different triggering voltages from one another, the output of these diodes being connected to the other heart electrode, whilst outside the body of the patient there is a magnet for selctively actuating the relays.

The tube relays are preferably flexible reed relays, although it is possible also to use other types, such as ball relays or mercury relays.

In order that the invention will become more fully understood, the following description is given by way of example only, reference being made to the accompanying drawing, in which.

Figure 1:
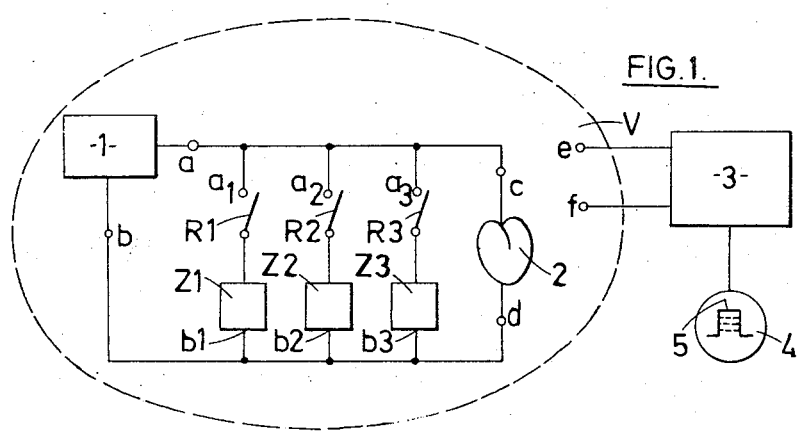
FIG. 1 is a circuit diagram of the voltage apparatus according to the invention, shown implanted and with an electro-cardiograph connected to the patient

It is apparent from studying FIG. 1 that the heart stimulator 1, which contains a supply battery which is not shown, supplies, at its terminals $a$ and $b$, a voltage to a circuit connected to the electrodes $c$ and $d$ of the patient's heart 2.

The human body is generally represented by a volume V, at the surface of which voltage tappings $e$ and $f$ are located and are connected to an electro-cardiograph 3, the recorder 4 of which receives the detected pulses 5. The steeply ascending voltage pulses supplied to the terminals $a$ and $b$ are of the order of 6 volts. They last for between 1 and 2 milliseconds, and provide a current of the order of 2 or 3 milliamperes. On the electro-cardiograph, it is possible to measure, for example, pulses of the order of 100 millivolts. As shunts in the circuit, from the conductor joining terminal $a$ to contact $c$ on the one hand, and from the conductor joining terminal $b$ to contact $d$ on the other hand, there are located three parallel branches each of which contains a flexible reed relay $R_1$, $R_2$ and $R_3$, the contacts of which are, on the one side, $a_1$, $a_2$ and $a_3$, connected to the conductor $ac$. On the other side, each of the contacts is connected to a Zener diode, $Z_1$, $Z_2$ and $Z_3$, the outputs of which are respectively $b_1$, $b_2$ and $b_3$, and are all connected to the abovementioned conductor $bd$. The trigger voltages of the Zener diodes are, for example, respectively 4.5. volts for $Z_1$, 3 volts for $Z_2$ and 1.5 volts for $Z_3$. By causing an external magnetic field to act selectively on the three relays $R_1$, $R_2$ and $R_3$, it is thus possible to cut off the output voltage of the heart-stimulator to one of the three voltage levels which have just been indicated.

Figure 4:
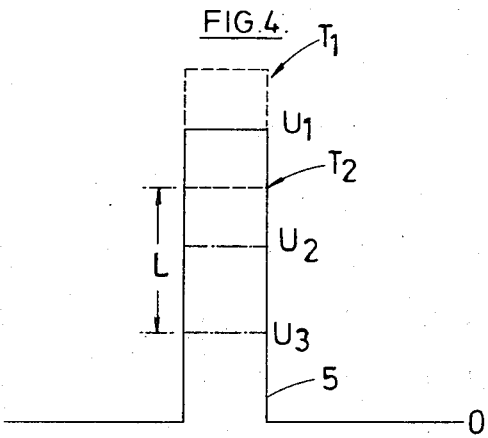
FIG. 4 is a diagram illustrating a voltage pulse as appearing on the electro-cardiograph plot.

Referring to FIG. 4, which represents the picked up pulse 5 on a larger scale, the initial voltage which appears and which corresponds to an unknown voltage level at the terminals $ab$ has been denoted by $T_1$. If the relay $R_1$ is employed, a voltage $U_1$ is picked up which corresponds to the trigger voltage of 4.5 volts of the circuit of the electrodes. By a simple proportionality rule between 4.5 volts and the measured value of $U_1$ and the measured value of $T_1$, it is possible to deduce the actual value of the normal operating voltage which appears at the terminals ab. However, if it so happens that the triggered voltage introduced via $R_1$ is too high, that is to say that it is greater than the actual operating voltage $T_2$, no triggering of diode $Z_1$ takes place. A second switch relay $R_2$ is then closed in place of switch relay $R_1$ to carry out the same operation, represented in FIG. 4 by the voltage $U_2$, the triggered voltage of diode $Z_2$ read on the electro-cardiograph with $T_2$ being the voltage read which represents the actual voltage of the stimulator. In addition, a third triggered voltage level corresponding to the trigger voltage of diode $Z_3$ can be provided, which gives a read voltage $U_3$, this level being, in every case, greater than the excitation threshold of the heart at the time when the apparatus was placed in position, but which is sufficiently low subsequently to detect, due to inadequate stimulation, an increase in the stimulation threshold of the heart at this same level $U_3$. Moreover, it is possible to have a larger number of relays in order to have several intermediate thresholds. If it has already been found that the operating voltage is, for example, $T_2$ corresponding to the actual voltage at the terminals, the voltage margin available to the heart stimulator will be known by the difference $L = T_2 - U_3$. If this margin were too small, a surgical operation would be necessary to give the heart stimulator more energy. Thus a calibration of the heart stimulator is obtained, that is to say the difference between the energy which is given and that which is required by the organism, or alternatively the actual difference which exists between the signal which is applied and the threshold for stimulating the myocardium.

Figures 2, 3:
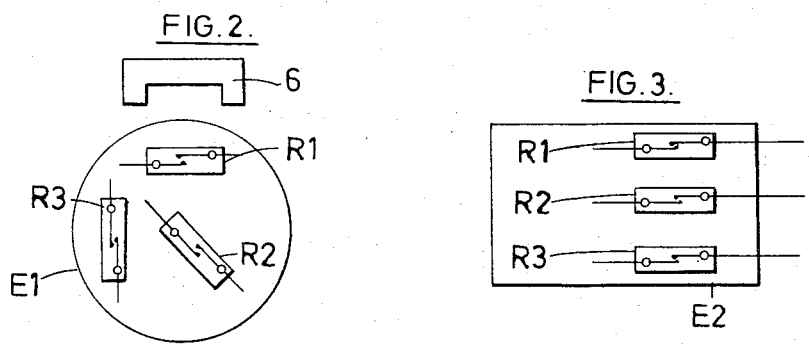
FIG. 2 is a schematic view of one arrangement of the switch relays.
FIG. 3 is a schematic view of another arrangement of the switch relays.

FIG. 2 represents a possible arrangement for the flexible reed relays $R_1$, $R_2$ and $R_3$, enclosed in a space in the body, symbolized by $E_1$. The longitudinal axes of the relays are arranged radially with angles of 45° between them. A magnet 6 placed outside the body, can pivot about its pole corresponding to the point where the relay axes meet, and due to this pivoting it will be possible to actuate in turn the relays $R_1$, $R_2$ and $R_3$.

According to the arrangement of FIG. 3, the space $E_2$ contains the three relays $R_1$, $R_2$ and $R_3$, placed in a parallel arrangement. This parallel arrangement can, moreover, be spread out widthwise or depthwise. In the case of a widthwise spreading, the magnet 6 will undergo a parallel translation in order to excite the three relays in succession. In the case where the relays (possessing equivalent magnetic sensitivities) were spread apart depthwise, they could be actuated in succession by gradually bringing the magnet closer. This gradual approach can also control relays which are placed side by side at the same depth but which possess different magnetic sensitivities. This technique for exciting the flexible reed relays comprises, furthermore, measures for preventing the inopportune excitation of the relays by lines of force which are too distant from the magnet, but it is not necessary to describe this known technique in more detail.

Of course, the process of the invention can be applied to any implanted system for supplying a heart stimulator and the device described above can be constructed in various ways without departing from the spirit of the invention.

I claim:

1. A method of testing the pulse potential appearing at the terminal electrodes of a heart stimulator within the body of a patient, said method comprising the steps of providing a plurality of voltage triggered conducting shunts, each having a separate remotely operable isolating switch, and connected in parallel across said terminal electrodes, the known voltage to trigger each shunt being different, connecting an electrocardiograph to the patient, remotely switching said shunts in turn from the exterior of the patient, starting with a shunt of the highest trigger voltage, until the electrocardiograph indicates a change in the voltage reading corresponding to one of the known trigger voltages, and thus determining the value of the pulse potential of the heart stimulator.

2. A method as claimed in claim 1, and further comprising the step of switching in for a short time, a shunt having a sufficiently low trigger voltage so as to test the stimulation threshold of the heart.

3. A method as claimed in claim 1, wherein the remote switching of the shunts is effected magnetically.

4. Heart stimulation apparatus comprising, as an implantable unit, a heart stimulator, terminal electrodes of said heart stimulator connectable to a patient's heart, a plurality of shunts connected in parallel across said terminal electrodes, each shunt including a separate remotely operable isolating switch and triggerable conducting means, the known voltage to trigger each shunt being different.

5. Heart stimulation apparatus as claimed in claim 4, wherein said triggerable conducting means comprise Zener diodes.

6. Heart stimulation apparatus as claimed in claim 4, wherein said remotely operable isolating switches each comprise a relay of the magnetically operable sealed tube flexible reed type.

7. Heart stimulation apparatus according to claim 6, wherein three relays are employed, which are arranged radially whereby the closing of said switches may be achieved by pivoting a magnet successively over said relays.

8. Heart stimulating apparatus as claimed in claim 6, wherein three relays are employed arranged in parallel directions to one another, the switching being effected by corresponding translational movement of the magnet.

9. Heart stimulating apparatus as claimed in claim 6, wherein three relays of different magnetic sensitivity are employed said relays being arranged in parallel, whereby the selective switching may be achieved by bringing the magnet closer or taking it further away from the patients body.

10. Heart stimulation apparatus as claimed in claim 6, wherein three relays of equivalent magnetic sensitivities are employed these being arranged so as to be adapted to be disposed at different depths in the patient.

* * * * *